(12) United States Patent
Nguyen et al.

(10) Patent No.: US 12,043,729 B2
(45) Date of Patent: Jul. 23, 2024

(54) ISOBUTYLENE-BASED POLYMERS WITH OLEFINIC SIDE CHAIN SUBSTITUENTS AND CURABLE COMPOSITIONS CONTAINING THE SAME

(71) Applicant: ExxonMobil Chemical Patents Inc., Baytown, TX (US)

(72) Inventors: Paul Tu Quang Nguyen, League City, TX (US); Ranjan Tripathy, Sugar Land, TX (US); Jason A. Mann, Houston, TX (US); Yuan-Ju Chen, Houston, TX (US); Edward J. Blok, Huffman, TX (US); Anthony J. Dias, Houston, TX (US); Abdul M. Jangda, Humble, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 946 days.

(21) Appl. No.: 17/040,845

(22) PCT Filed: Mar. 29, 2019

(86) PCT No.: PCT/US2019/024930
§ 371 (c)(1),
(2) Date: Sep. 23, 2020

(87) PCT Pub. No.: WO2019/195116
PCT Pub. Date: Oct. 10, 2019

(65) Prior Publication Data
US 2021/0024734 A1 Jan. 28, 2021

Related U.S. Application Data

(60) Provisional application No. 62/651,980, filed on Apr. 3, 2018.

(30) Foreign Application Priority Data

May 16, 2018 (EP) .................................... 18172741

(51) Int. Cl.
| | | |
|---|---|---|
| C08L 23/22 | (2006.01) |
| C08F 8/32 | (2006.01) |
| C08F 8/40 | (2006.01) |
| C08F 8/44 | (2006.01) |
| C08K 3/06 | (2006.01) |
| C08K 5/00 | (2006.01) |
| C08K 5/31 | (2006.01) |
| C08K 5/40 | (2006.01) |
| C08K 5/435 | (2006.01) |
| C08K 5/44 | (2006.01) |

(52) U.S. Cl.
CPC ................ *C08L 23/22* (2013.01); *C08F 8/32* (2013.01); *C08F 8/40* (2013.01); *C08F 8/44* (2013.01); *C08K 3/06* (2013.01); *C08K 5/0025* (2013.01); *C08K 5/31* (2013.01); *C08K 5/40* (2013.01); *C08K 5/435* (2013.01); *C08K 5/44* (2013.01); *C08F 2810/30* (2013.01); *C08F 2810/50* (2013.01); *C08L 2312/00* (2013.01)

(58) Field of Classification Search
CPC ....... C08L 23/22; C08L 2312/00; C08K 5/44; C08K 5/435; C08K 5/40; C08K 5/31; C08K 5/0025; C08K 3/06; C08F 2810/30; C08F 8/44; C08F 8/40; C08F 8/32; C08F 2810/50
USPC .......................................... 524/102
See application file for complete search history.

(56) References Cited

U.S. PATENT DOCUMENTS

2016/0108140 A1* 4/2016 Adkinson .................. C08J 3/24
525/287

FOREIGN PATENT DOCUMENTS

| CA | 2009681 | 4/1991 |
| WO | WO 2002/31039 | 4/2002 |
| WO | WO 2002/31049 | 4/2002 |
| WO | WO 2014/094117 | 6/2014 |
| WO | WO 2014/094121 | 6/2014 |
| WO | WO 2014/100890 | 7/2014 |

OTHER PUBLICATIONS

Solis et al., "How to Pick Proper Model Vulcanization Systems: Part 2 of 2", Rubber and Plastic News, vol. 36, Issue 25, Jul. 9, 2007, pp. 13-19.

* cited by examiner

Primary Examiner — Hui H Chin (57) ABSTRACT

Provided herein are isobutylene-based polymer compositions comprising functionalized isobutylene-based polymer with olefinic side chain substituents, and a sulfur donor and/or accelerator cure system. The functionalized polymer is produced via nucleophilic substitution reaction in solution. The present functionalized isobutylene-based polymer compositions together with various accelerators and sulfur donors can form thermosets useful for pharmaceutical and tire applications without the use of zinc or a zinc oxide activator.

24 Claims, 8 Drawing Sheets

ISOBUTYLENE-BASED POLYMERS WITH OLEFINIC SIDE CHAIN SUBSTITUENTS AND CURABLE COMPOSITIONS CONTAINING THE SAME

CROSS-REFERENCE TO RELATED APPLICATIONS

This invention is a 371 National Phase entry of International Application No. PCT/US2019/024930 filed Mar. 29, 2019, which claims priority to and the benefit of U.S. Ser. No. 62/651,980, filed Apr. 3, 2018 and EP Application No. 18172741.3, filed May 16, 2018, which are incorporated herein by reference in their entirety.

FIELD OF THE INVENTION

The present disclosure generally relates to functionalized isobutylene-based polymers useful in curable compositions, and more particularly relates to isobutylene-based polymers with olefinic side chain substituents and curable compositions containing the same.

BACKGROUND OF THE INVENTION

Curing isobutylene-based elastomers is generally more complex than that for general-purpose rubbers. Powers, K. W. et al., Functionalized Copolymers of Para-AlkylStyrene/Isoolefin Prepared by Nucleophilic Substitution, CA 2009681. For example, while isobutylene co-para-methylstyrene elastomer compositions provide improved permeability characteristics for end products, use of poly(isobutylene-co-para-methylstyrene) ("BIMSM") compositions have drawbacks when compared to other butyl-based compositions. These drawbacks include a limited cure versatility.

Further, regardless of the cure system, vulcanization rates between adjacent components must be similar in the isobutylene-based polymer composition. With otherwise superior mechanical properties, incompatible cure rates of the various polymers in the composition can cause separation of the composite because good interfacial adhesion is not created during crosslinking and cure.

While the selection of a specific cure system is a function of the polymer type and the specific in-service requirements of the thermoset product, cure systems used for isobutylene-based elastomers are often sulfur-based and use metal oxides such as zinc oxide systems. Moreover, because the backbone of isobutylene-based elastomers are highly saturated, ultra-fast accelerators are required for efficient vulcanization. Many ultra-fast accelerators are nitrosamine generators and use of such accelerators is not recommended.

Further, vulcanization chemistry for the numerous types of isobutylene-based polymers can vary. For example, because of the absence of carbon-carbon double bonds in the backbone and the presence of the reactive benzylic bromide, the vulcanization chemistry for BIMSM differs from that of other isobutylene-based elastomers. See, S. Solis, et al., How to Pick Proper Model Vulcanization Systems: Part 2 of 2, Rubber World, Jul. 9, 2007. Brominated poly(isobutylene-co-para-methylstyrene) will not sufficiently crosslink with sulfur donor or sulfur/sulfur donor systems alone.

As such, crosslinking of BIMSM generally involves formation of carbon-carbon bonds via a Friedel-Crafts alkylation reaction catalyzed by zinc halides. Then, stearic acid functions as an accelerator of BIMSM vulcanization. Zinc stearate formed as a product of the reaction between zinc oxide and stearic acid can react with BIMSM and displace benzylic bromine. As reported, in the absence of stearic acid, cure rates are very low.

A need exists, therefore, for functionalized isobutylene-based polymers which can form thermosets with conventional accelerators and sulfur donors, and without the use of zinc or a zinc oxide activator.

SUMMARY OF THE INVENTION

Provided herein are isobutylene-based polymer compositions comprising isobutylene-based polymer having an olefinic side chain substituent, and a sulfur donor and/or accelerator cure system. In an aspect, the functionalized polymer is poly(isobutylene-co-para-methylstyrene) containing an olefinic side-chain substituent. The isobutylene-based polymer composition can further comprise at least one filler. In an aspect, the filler is selected from the group of carbon black, white filler and/or mixtures thereof. In an aspect, the sulfur donor is selected from the group consisting of tetramethyl thiuram disulfide ("TMTD"), 4,4'-dithiodimorpholine, dipentamethylene thiuram tetrasulfide ("DPTT"), and thiocarbamoyl sulfonamide. In an aspect, the accelerator cure system comprises one or more of thiazoles, amines, guanidines, sulfenamides, thiurams, dithiocarbamates, and/or zanthates. In an aspect, the accelerator cure system is N-cyclohexyl-2-benzothiazole sulfenamide ("CBS") or diphenylguanidine.

Also, provided herein are zinc-free thermoset compositions comprising isobutylene-based polymer having an olefinic side chain substituent, and a sulfur donor and/or accelerator cure system. In an aspect, the isobutylene-based polymer is isobutylene-co-para-methylstyrene having an olefinic side chain substituent. The zinc-free thermoset composition can further comprise at least one filler. In an aspect, the filler is selected from the group of carbon black, white filler and/or mixtures thereof. In an aspect, the sulfur donor is selected from the group consisting of tetramethyl thiuram disulfide ("TMTD"), 4,4'-dithiodimorpholine, dipentamethylene thiuram tetrasulfide ("DPTT"), and thiocarbamoyl sulfonamide. In an aspect, the accelerator cure system comprises one or more of thiazoles, amines, guanidines, sulfenamides, thiurams, dithiocarbamates, and/or zanthates. In an aspect, the accelerator cure system is N-cyclohexyl-2-benzothiazole sulfenamide ("CBS") or diphenylguanidine.

As used herein the term "zinc-free composition" refers to a composition "substantially free of zinc," or in other terms having less than 0.01 wt % zinc based on the total weight of the composition.

Further provided herein are rubber compositions comprising isobutylene-based polymer having an olefinic side chain substituent, and a sulfur donor and/or accelerator cure system. In an aspect, the isobutylene-based polymer having an olefinic side chain substituent is poly(isobutylene-co-para-methylstyrene). The rubber composition can further comprise at least one filler. In an aspect, the filler is selected from the group of carbon black, white filler and/or mixtures thereof. In an aspect, the sulfur donor is selected from the group consisting of tetramethyl thiuram disulfide ("TMTD"), 4,4'-dithiodimorpholine, dipentamethylene thiuram tetrasulfide ("DPTT"), and thiocarbamoyl sulfonamide. In an aspect, the accelerator cure system comprises one or more of thiazoles, amines, guanidines, sulfenamides, thiurams, dithiocarbamates, and/or zanthates. In an aspect, the accelerator cure system is N-cyclohexyl-2-benzothiazole sulfenamide ("CBS") or diphenylguanidine.

DESCRIPTION OF THE PREFERRED EMBODIMENTS

Various specific embodiments, versions and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

All numerical values within the detailed description and the claims herein are modified by "about" or "approximately" the indicated value, taking into account experimental error and variations.

For the purposes of this disclosure, the following definitions will apply:

As used herein, the term "alkyl" refers to a paraffinic hydrocarbon group which may be derived from an alkane by dropping one or more hydrogens from the formula, such as, for example, a methyl group ($CH_3$), or an ethyl group ($CH_3CH_2$).

The term "elastomer" may be used interchangeably with the term "rubber" and refers to any composition comprising at least one elastomer.

The term "rubber" refers to any polymer or composition of polymers consistent with the ASTM D1566 definition: "a material that is capable of recovering from large deformations, and can be, or already is, modified to a state in which it is essentially insoluble (but can swell) in boiling solvent.

As used herein, the term "rubber" includes, but is not limited to, at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Halogenated rubbers are also described in U.S. Pat. Nos. 4,703,091 and 4,632,963.

The term "phr" refers to parts per hundred rubber and is a measure of the component of a composition relative to 100 parts by weight of the elastomer (rubber component) as measured relative to total elastomer. The total phr (or parts for all rubber components, whether one, two, three, or more different rubber components) is always defined as 100 phr. All other non-rubber components are a ratio of the 100 parts of rubber and are expressed in phr.

The term "isoolefin" refers to a $C_4$ to $C_7$ compound and includes, but is not limited to, isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. An exemplary polymer can be obtained by reacting 92 to 99.5 wt % of isobutylene with 0.5 to 8 wt % isoprene, or reacting 95 to 99.5 wt % isobutylene with from 0.5 to 5.0 wt % isoprene.

The term "substituted" refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, and the like; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, and p-ethylstyrene, and the like.

As used herein, the term isobutylene-based polymer composition can be referred to as a "butyl-based composition," a "butyl-based elastomer composition," a "butyl-based polymer composition," and/or an "isobutylene-based elastomer composition." The terms "isobutylene-based elastomer" and "isobutylene-based polymer" can be used interchangeably and each refers to polymers comprising a plurality of repeat units from isobutylene. "Isobutylene-based elastomer" or "isobutylene-based polymer" refers to elastomers or polymers comprising at least 70 mole percent repeat units from isobutylene.

As described herein, rubber can be a halogenated rubber or halogenated butyl rubber such as brominated butyl rubber or chlorinated butyl rubber. General properties and processing of halogenated butyl rubbers is described in THE VANDERBILT RUBBER HANDBOOK 105-122 (R. F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by E. Kresge and H. C. Wang in 8 KIRK-OTHMER ENCYCLOPEDIA OF CHEMICAL TECHNOLOGY 934-955 (John Wiley & Sons, Inc. 4th ed. 1993).

The butyl rubber can be halogenated in hexane diluent at from 40 to 60° C. using bromine ($Br_2$) or chlorine ($Cl_2$) as the halogenation agent. The halogenated butyl rubber has a Mooney viscosity of from 20 to 70 (ML 1+8 at 125° C.), or from 25 to 55. The halogen content is from 0.1 to 10 wt % based in on the weight of the halogenated butyl rubber or from 0.5 to 5 wt %. The halogen wt % of the halogenated butyl rubber is from 1 to 2.2 wt %.

As used herein, "halogenated butyl rubber" refers to both butyl rubber and "star-branched" butyl rubber. The halogenated rubber can be a halogenated copolymer of a $C_4$ (as noted sometimes as "C4") to $C_7$ (also noted sometimes as "C7") isoolefin and a multiolefin. The halogenated rubber component can be a blend of a polydiene or block copolymer, and a copolymer of a $C_4$ to $C_7$ isoolefin and a conjugated, or a "star-branched" butyl polymer. The halogenated butyl polymer can be described as a halogenated elastomer comprising $C_4$ to $C_7$ isoolefin derived units, multi-olefin derived units, and halogenated multiolefin derived units, and includes both "halogenated butyl rubber" and so called "halogenated star-branched" butyl rubber.

Halogenated butyl rubber can be produced from the halogenation of butyl rubber. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. Preferably, the olefin polymerization feeds employed in producing halogenated butyl rubber include those olefinic compounds conventionally used in the preparation of butyl-type rubber polymers. The butyl polymers are prepared by reacting a co-monomer mixture, the mixture having at least one (1) $C_4$ to $C_7$ isoolefin monomer component such as isobutylene with (2) a multi-olefin, or conjugated diene, monomer component. The isoolefin can be in a range from 70 to 99.5 wt % by weight of the total comonomer mixture, or 85 to 99.5 wt %. The conjugated diene component is present in the comonomer mixture from 30 to 0.5 wt % or from 15 to 0.5 wt %. From 8 to 0.5 wt % of the co-monomer mixture is conjugated diene.

As used herein, EXXPRO® refers to a brominated isobutylene-co-para methyl styrene (BIMSM) rubber or isobutylene-co-para-methyl-styrene based elastomer, produced by catalytic polymerization of isobutylene and isoprene and manufactured by ExxonMobil useful in a variety of consumer applications including tires and medical tube stoppers.

As used herein, the term "bromobutyl" or "bromobutyl polymer" refers to brominated isobutylene-isoprene or brominated isobutylene-isoprene rubber ("BIIR") as manufactured by ExxonMobil Chemical, a family of butyl rubbers used in a variety of consumer applications including tires and various medical applications.

In an aspect, an exemplary halogenated butyl rubber is Bromobutyl 2222 (ExxonMobil Chemical Company). Bromobutyl 2222, also known as BIIR 2222, refers to a brominated copolymer of isobutylene and isoprene having a specific gravity of 0.93; a Mooney viscosity target of 32, a minimum of 28, and a maximum of 36; a bromine composition target of 1.03%, a minimum of 0.93%, and a maximum of 1.13%; and a calcium composition target of 0.15%, a minimum of 0.12%, and a maximum of 0.18%. Further, cure characteristics of Bromobutyl 2222 are as follows: MH is from 28 to 40 dNm, ML is from 7 to 18 dNm (ASTM D2084, modified).

Another commercial available halogenated butyl rubber is Bromobutyl 2255 (ExxonMobil Chemical Company). Its Mooney viscosity is from 41 to 51 (ML 1+8 at 125° C., ASTM 1646, modified), and the bromine content is from 1.8 to 2.2 wt %. Further, cure characteristics of Bromobutyl 2255 are as follows: MH is from 34 to 48 dNm, ML is from 11 to 21 dNm (ASTM D2084, modified).

Star-branched halogenated butyl rubber ("SBHR") is a composition of a butyl rubber, either halogenated or not, and a polydiene or block copolymer, either halogenated or not. This halogenation process is described in detail in U.S. Pat. Nos. 4,074,035, 5,071,913, 5,286,804, 5,182,333 and 6,228,978. The secondary polymer is not limited by the method of forming the SBHR. The polydienes/block copolymer, or branching agents (hereinafter "polydienes"), are typically cationically reactive and are present during the polymerization of the butyl or halogenated butyl rubber or can be blended with the butyl or halogenated butyl rubber to form the SBHR. The branching agent or polydiene can be any suitable branching agent, and the invention is not limited to the type of polydiene used to make the SBHR.

The SBHR is typically a composition of butyl or halogenated butyl rubber and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt %, or from 0.3 to 3 wt % or from 0.4 to 2.7 wt %.

A commercial SBHR is Bromobutyl 6222 (ExxonMobil Chemical Company), having a Mooney viscosity (ML 1+8 at 125° C., ASTM 1646, modified) of from 27 to 37, and a bromine content of from 2.2 to 2.6 wt % relative to the SBHR. Further, cure characteristics of Bromobutyl 6222 are as follows: MH is from 24 to 38 dNm, ML is from 6 to 16 dNm (ASTM D2084, modified)

The term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

As used herein, a "polymer" has two or more of the same or different "mer" units. A "homopolymer" is a polymer having mer units that are the same. A "copolymer" is a polymer having two or more mer units which are different from each other. Copolymer means polymers having more than one type of monomer, including interpolymers, terpolymers, or higher order polymers. A "terpolymer" is a polymer having three mer units that are different from each other. "Different" in reference to mer units indicates that the mer units differ from each other by at least one atom or are different isomerically. The terms polyolefin and polymer are sometimes used interchangeably herein.

The term "copolymer" refers to random polymers of $C_4$ to $C_7$ isoolefins derived units and alkylstyrene. For example, a copolymer can contain at least 85% by weight of the isoolefin, about 8 to about 12% by weight alkylstyrene, and about 1.1 to about 1.5 wt % of a halogen. For example, a copolymer can be a random elastomeric copolymer of a $C_4$ to $C_7$ alpha-olefin and a methylstyrene containing at about 8 to about 12% by weight methylstyrene, and 1.1 to 1.5 wt % bromine or chlorine. Alternatively, random copolymers of isobutylene and para-methylstyrene ("PMS") can contain from about 4 to about 10 mol % para-methylstyrene wherein up to 25 mol % of the methyl substituent groups present on the benzyl ring contain a bromine or chlorine atom, such as a bromine atom (para-(bromomethylstyrene)), as well as acid or ester functionalized versions thereof.

As used herein, comonomers can be linear or branched. Linear comonomers include, but are not limited to, ethylene or $C_4$ to $C_8$ α-olefins, 1-butene, 1-hexene, and 1-octene. Branched comonomers include 4-methyl-1-pentene, 3-methyl-1-pentene, and 3,5,5-trimethyl-1-hexene. Comonomers include styrene.

As provided herein, examples of isobutylene-based polymers include isobutylene-isoprene elastomers such as butyl rubber ("IIR"), halogenated elastomers such as bromobutyl rubber ("BIIR"), chlorobutyl rubber ("CIIR"), star branched bromobutyl rubber ("SBB"), and star branched chlorobutyl ("SBC") and brominated isobutylene para-methylstyrene ("BIMSM"). Poly(isobutylene-co-para-methylstyrene) elastomer and brominated poly(isobutylene-co-para-methylstyrene) ("BIMSM") are currently sold under the trade name of EXXPRO®.

Functionalized polyolefins are functionalized polymers (also referred to sometimes as functionalized olefins) having one or more polar and nonpolar functionalities, i.e., specific groups or moieties of atoms or bonds within the molecules that are responsible for the characteristic chemical reactions of the molecules. The functional group can undergo the same or similar chemical reaction regardless of the size of the polymer backbone, allowing for systematic prediction of chemical reactions and polymer behavior as well as design of chemical synthesis. Once functionalized, atoms of the functional groups are typically linked to each other and the polymer by covalent bonds. The reactivity of a functional group can be modified by other functional groups nearby.

Randomly functionalized polyolefins have differing types, location and amount of functionality on the polyolefin backbone. Categories of functionalized polyolefin include randomly functionalized polyolefins and graft polyolefins. Using a post-functionalization technique, the functionality (moiety or chemical group) is attached onto a preexisting polymer backbone.

To post-functionalization the polyolefin backbone, the functionality can be attached onto the backbone via nucleophilic substitution. As exemplified immediately below, nucleophilic substitution can be carried out via reactive mixing without the use of a solvent or in solution in the presence of a solvent such as THF, toluene or xylene:

Nu = phenoxide, alkoxide, carboxylate, thiolates, thioethers, thiocarboxylates, dithiocarboxylates, thiourea, dithiocarbamates, xanthates, thiocyanates, silanes, amines, phosphines Grafting polyolefins with a functional group can deliver an improvement in the properties of the isobutylene-based polymer. As a post-polymerization reaction, grafting methodologies can chemically modify the macromolecular backbone of the polyolefin in order to introduce active sites capable of functionality. In solution, functionalized polymers can be produced by nucleophilic substitution processing. See e.g., European Patent No. 497758 B1 (where the reaction was performed in the presence of a solvent). The functionalized isobutylene-based polymers can then be crosslinked and cured under various systems. See e.g., U.S. Publication No. 2016/0108141.

Under this process, polymers which can be modified include, but are not limited to, halogenated isoolefin polymers, halobutyl rubber, star-branched bromobutyl, brominated poly(isobutylene-co-para-methylstyrene) ("BIMSM"), and brominated isobutylene-isoprene-para-methylstyrene terpolymers.

However, as noted above, while brominated poly(isobutylene-co-para-methylstyrene) elastomers display many properties superior to natural rubber and other isobutylene-based polymers, BIMSM cures sufficiently only with the use of zinc or ZnO. S. Solis, et al., How to Pick Proper Model Vulcanization Systems: Part 2 of 2, Rubber World, Jul. 9, 2007. For example, in many instances, the use of 1 phr of ZnO and 2 phr of stearic acid in a carbon black filled BIMSM compound is sufficient to obtain a reasonable cure state. Id. Furthermore, while zinc stearate can cure BIMSM, reversion is minimized by addition of ZnO. Therefore, BIMSM cure systems which produce a vulcanizate with adequate scorch and reversion resistance contain a thiazole such as MBTS, sulfur, ZnO and stearic acid. Reportedly, cure systems where zinc is absent will not be effective for BIMSM. Id Moreover, isobutylene-based elastomers are highly saturated. Therefore, isobutylene-based elastomers generally require ultra-fast accelerators such as thiurams ("TMTD") and dithiocarbamates ("ZDMC") for an effective cure.

Generally, the development of halogenated butyl rubber has extended the usefulness of butyl-based polymers by providing higher curing rates and enabling co-vulcanization of general purpose rubbers such as natural rubber and styrene-butadiene rubber. Butyl rubber and halobutyl rubber are high value polymers, because these polymers possess a combination of properties, for example, excellent impermeability, good flex, good weatherability, co-vulcanization with high unsaturation rubbers, in the case of halobutyl. The combination of properties has aided the development of more durable tubeless tires with the air retaining inner liner chemically bonded to the body of the tire. U.S. Publication No. 2016/0108141, Paragraphs [0005] to [0011].

In addition to tire applications, the good impermeability, weathering resistance, ozone resistance, vibration dampening, and stability of halobutyl rubbers make them good candidates for materials for pharmaceutical stoppers, construction sealants, hoses, and mechanical goods.

Like other rubbers, for most applications, halobutyl rubber must be compounded and vulcanized (chemically cross-linked) to yield useful, durable end use products. The selection and ratios of fillers, processing aids, stabilizers, and curatives play important roles in both how the compound will process and how the thermoset product will behave.

Elemental sulfur and organic accelerators are widely used to crosslink butyl rubber. The low level of unsaturation requires aggressive accelerators such as thiuram or thiocarbamates. The vulcanization proceeds at the isoprene site with the polysulfidic cross links attached at the allylic positions, displacing the allylic hydrogen. The number of sulfur atoms per crosslink is between one and four or more. Cure rate and cure state both increase if the diolefin content is increased resulting in higher degree of unsaturation. Sulfur cross-links have limited stability at sustained high temperature.

In halobutyl rubber, the existence of allylic halogen allows easier cross-linking than allylic hydrogen due to the fact that halogen is a better leaving group in nucleophilic substitution reactions. Furthermore, bromobutyl is faster curing than chlorobutyl and has better adhesion to high unsaturation rubbers.

As provided herein, isobutylene-based polymer compositions (also referred to as thermoset compositions and/or rubber compositions) are prepared from functionalized poly(isobutylene-co-para-methylstyrene) having olefinic group side-chain substituents. Unlike the brominated poly(isobutylene-co-para-methylstyrene) or BIMSM which does not undergo curing with either sulfur or sulfur donor system, the subject synthesized isobutylene-based polymers have benzylic bromide partially substituted partially with amine and phosphine groups. The present isobutylene-based polymers are further substituted with an alkene chain which can form thermosets readily with sulfur donor system and without the use of zinc oxide activator. This clean, sulfur-free and zinc-free cure system can be used for highly demanding applications such as pharmaceutical rubber closures. In addition, the present thermoset compositions are further useful in tire applications with the use of EV or semi-EV vulcanization system for the new isobutylene-based polymer.

As described in the Examples below, we have prepared a modified poly(isobutylene-co-para-methylstyrene) where benzylic bromide is substituted partially with amine and phosphine groups, as well as fully replaced with a long alkene chain which can form thermosets readily with sulfur donor system without the use of a Lewis acid such as zinc oxide or zinc stearate.

For example, the modified poly(isobutylene-co-para-methylstyrene), BIMSM-amine ionomer derived from dimethyl soyaalkylamine has the following formula:

The modified poly(isobutylene-co-para-methylstyrene), BIMSM-amine ionomer derived from polyoxyethylene soyaalkylamine has the following formula:

The modified poly(isobutylene-co-para-methylstyrene), BIMSM-phosphine ionomer derived from diphenylphosphino styrene has the following formula:

The following examples are put forth so as to provide those skilled in the art with a complete disclosure and description and are not intended to limit the scope of that which the inventors regard as their invention.

EXAMPLE 1

Preparation of Modified Poly(isobutylene-co-para-methylstyrene)-Amine Ionomers by Reactive Mixing Process In this example, we prepared modified BIMSM-amine ionomers via reactive mixing process. All mixing experiments were performed in a Brabender Intelli-torque internal mixer using roller type 6 blades. The mixer temperature was set to 120° C. 60 grams of BIMSM (EXXPRO™ NPX 1602, Experimental product from ExxonMobil Chemical) elastomer was fluxed for 30 seconds at 60 rpms, the amine nucleophile (0.5 g or 0.13 mol equiv. of Armeen DMSVD or 0.81 gram or 0.13 mol equivalent of Ethomene S/15) was added slowly to the mixer. Once addition is complete, the compound was mixed for 10-12 minutes at 60 rpms. The modified EXXPRO™ product was removed from the mixer and cooled to room temperature by pressing between two Teflon sheets in a Carver press.

Figure 1A:
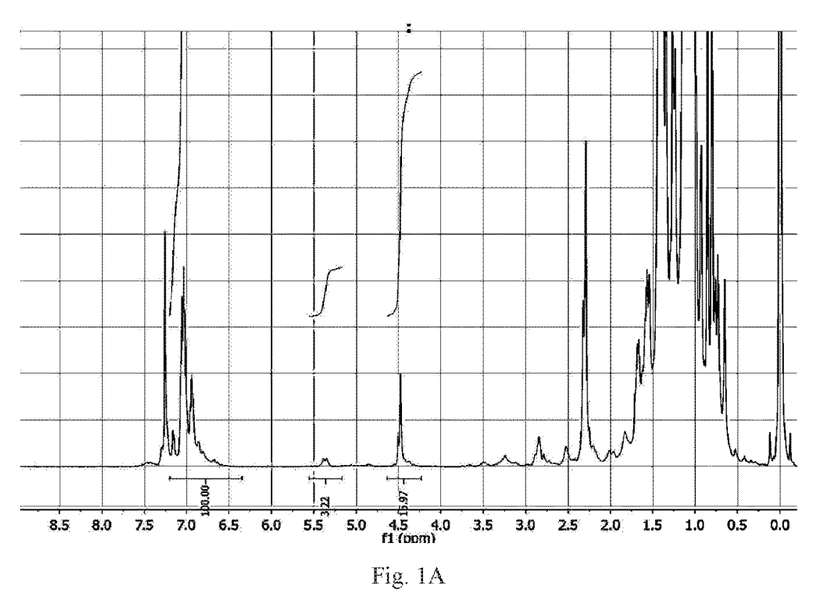
FIG. 1A is the characterization of the BIMSM-amine ionomer derived from a dimethyl soyalkylamine (Armeen DMSVD from AkzoNobel) using proton NMR spectroscopy that shows both the methylene proton (~$CH_2Br$), along with a new resonance appearing at 5.38 ppm for olefinic signal.

The BIMSM-amine ionomer derived from a dimethyl soyaalkylamine (Armeen DMSVD from AkzoNobel) (structural formula shown above) was characterized using proton NMR spectroscopy showing both the methylene proton (~$CH_2Br$), along with a new resonance appearing at 5.38 ppm for olefinic signal as shown in FIG. 1A.

Figure 1B:
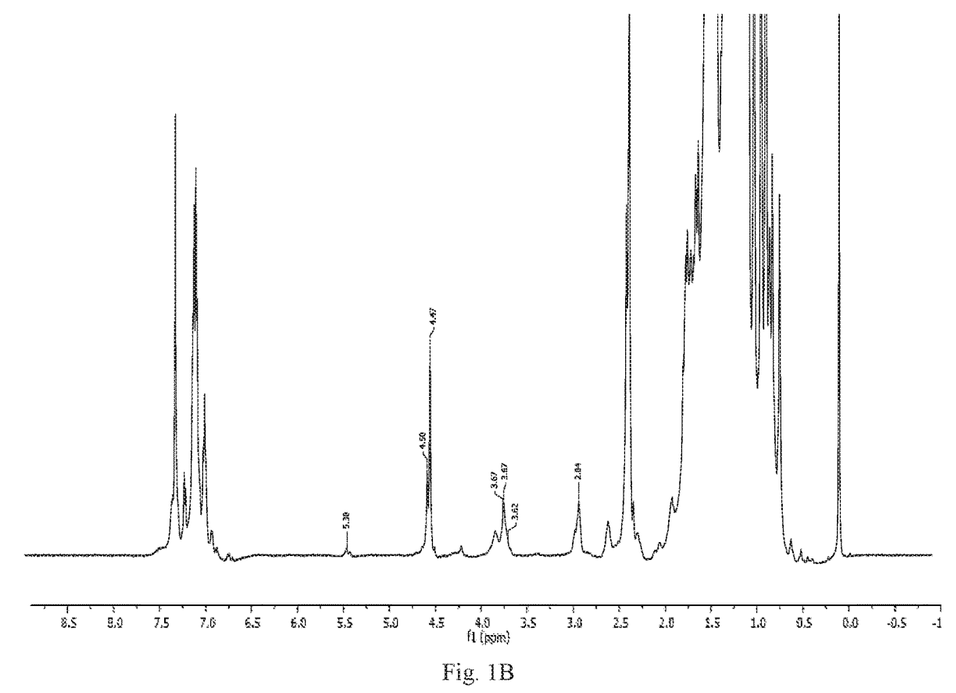
FIG. 1B is the characterization of the BIMSM-amine ionomer derived from a polyoxyethylene soyalkylamine (Ethomeen S/15 (from AkzoNobel) using proton NMR spectroscopy that shows both the methylene proton (~$CH_2Br$), along with new resonances appearing at 3.67 ppm for ~$CH_2O$ and olefinic signal at 5.38 ppm.

The BIMSM-amine ionomer derived from a polyoxyethylene soyalkylamine (Ethomeen S/15 (from AkzoNobel) was characterized using proton NMR spectroscopy showing both the methylene proton (~$CH_2Br$), along with new resonances appearing at 3.67 ppm for ~$CH_2O$ and olefinic signal at 5.38 ppm as shown in FIG. 1B.

EXAMPLE 2

Preparation of Modified BIMSM-Phosphine Ionomer via Reactive Mixing Process

All mixing experiments were performed in a Brabender Intelli-torque internal mixer using roller type 6 blades. The mixer temperature was set to 120° C. 60 grams of BIMSM (EXXPRO™ NPX 1602, Experimental product from ExxonMobil Chemical) elastomer was fluxed for 30 seconds at 60 rpms, the amine nucleophile (0.5 g or ca. 0.13 mol equivalent of diphenyldiphosphino styrene) was added slowly to the mixer. Once addition is complete, the compound was mixed for 10-12 minutes at 60 rpms. The modified EXXPRO product was removed from the mixer and cooled to room temperature by pressing between two Teflon sheets in a Carver press.

Figure 2:
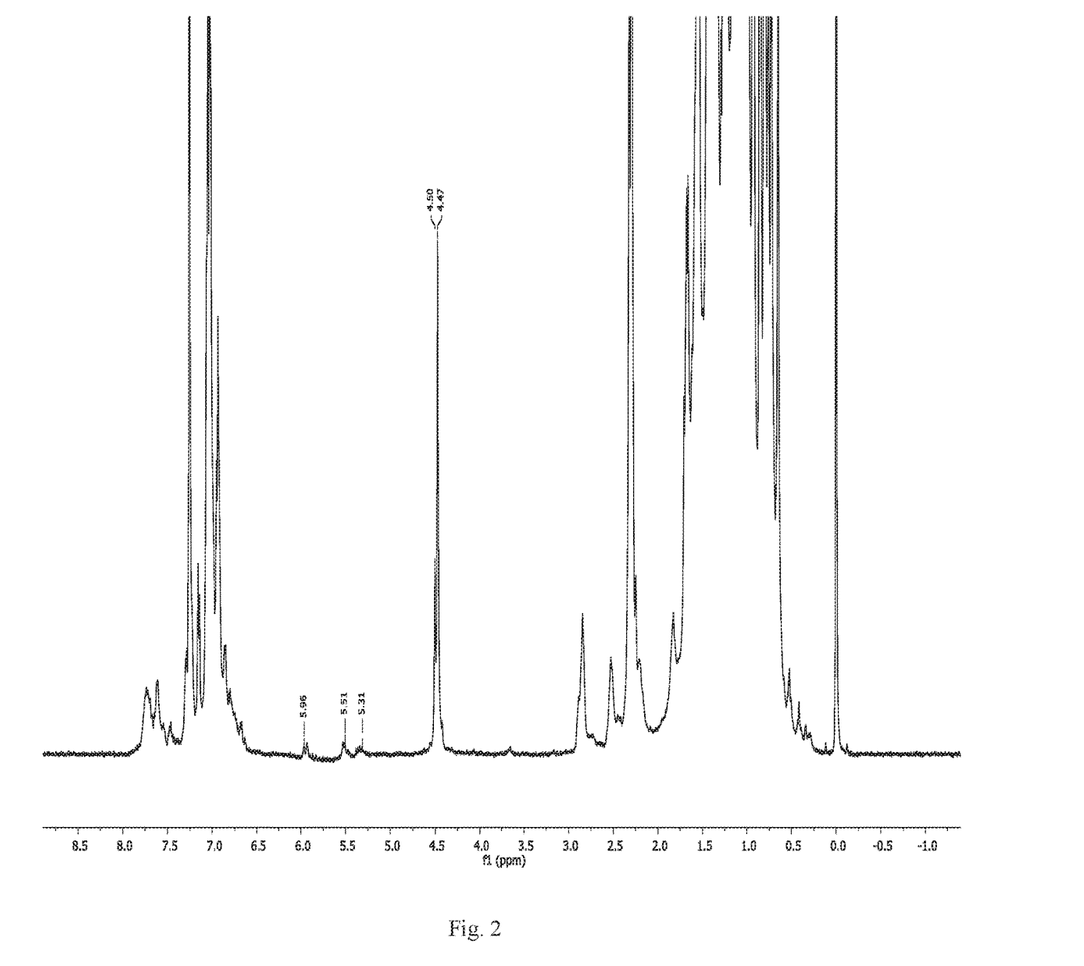
FIG. 2 is the characterization of the BIMSM-phosphine ionomer derived from diphenylphosphino styrene (Sigma Aldrich) using proton NMR spectroscopy showing both the methylene proton (~$CH_2Br$), along with new resonances appearing at 5.31, 5.51, 5.96 ppm for olefinic signals.

The BIMSM-phosphine ionomer derived from diphenylphosphino styrene (Sigma Aldrich) was characterized using proton NMR spectroscopy showing both the methylene proton (~$CH_2Br$), along with new resonances appearing at 5.31, 5.51, 5.96 ppm for olefinic signals as shown in FIG. 2.

EXAMPLE 3

Figure 3:
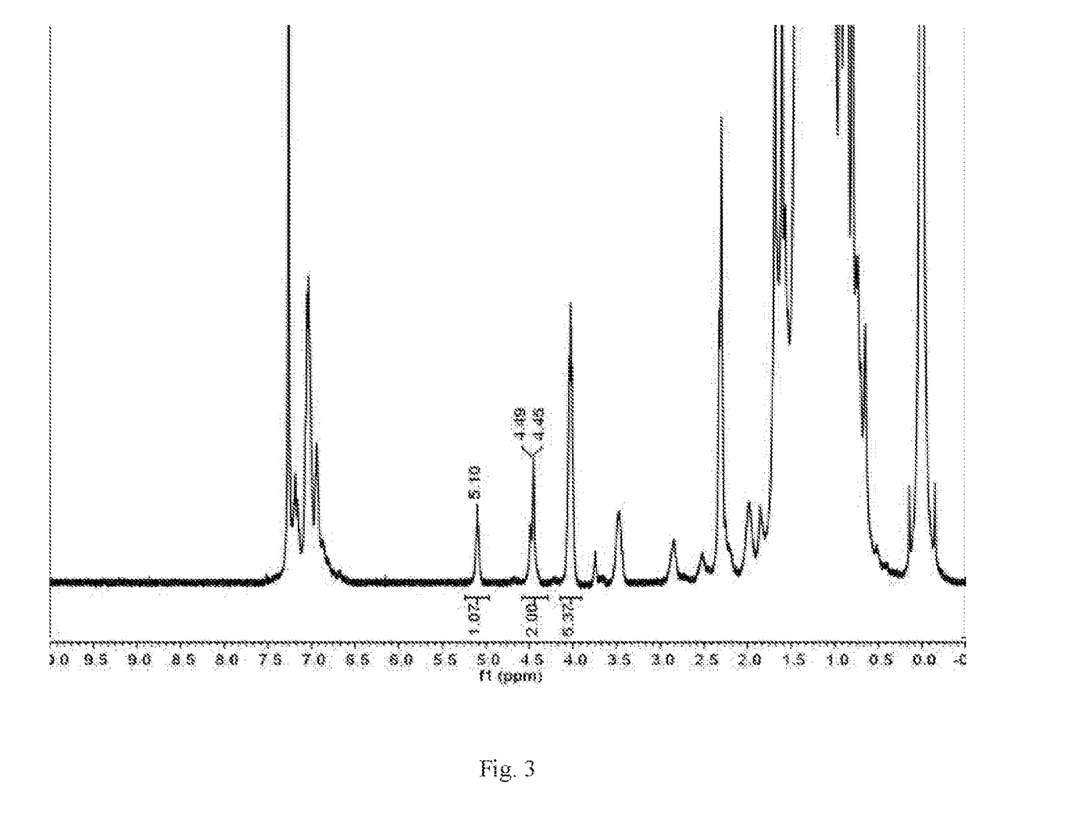
FIG. 3 is the characterization of the dried polymer using proton NMR spectroscopy showing complete disappearance of methylene proton (~$CH_2Br$), with new resonance appearing at 4.5 ppm for ~$CH_2O$ and olefinic signal at 5.1 ppm suggesting complete conversion at the end of 24 hours.

Preparation of Modified Poly(isobutylene-co-para-methylstyrene) Containing Citranellol Side Chain Substituent via Etherfication Using a Solution Process A nucleophilic substitution reaction of Citronellol with BIMSM (EXXPRO™ NPX 1602, Experimental product from ExxonMobil Chemical) elastomer was conducted in a fifty-liter glass reactor equipped with a stirrer and chiller. Dry Tetrahydrofuran (THF) (water ppm ≤10 ppm) was prepared by passing 99% THF (Sigma Aldrich) through 3A molecular sieve. 4000 grams of EXXPRO ($M_n$=221000 g/mole; 5002 g/mole Br; 0.799 mole) was added to the fifty-liter reactor under nitrogen blanket. The polymer was dissolved in the already prepared dry THF (38 liters) at constant stirring at 25° C. for 12 hours or until the polymer is dissolved. A catalyst slurry/sodium alkoxide of 7.99 mole (320 grams) of Sodium Hydride (60% oil), was prepared by adding slowly 1 liter of dry THF & 1.45 liter (1247 grams, 8.0 moles) of Citronellol under constant stirring. Once the evolution of hydrogen gas is complete, the catalyst slurry prepared was added slowly to the reactor containing dissolved polymer. The reaction mixture was held at 25° C. for 24 hours. At the end of the stipulated time, the reaction mixture is introduced into the quench pot containing 100 liters of isopropanol, to precipitate the functionalized polymer. The precipitated polymer was re-dissolved in a reactor containing 20 liters of isohexane and 2 wt % of Butylated hydroxytoluene (BHT; Sigma Aldrich). The re-dissolved polymer was introduced into the 50 L steam stripping pot, connected with a condenser and a chiller. The steam stripping is done using 20 kilograms per hour of steam under nitrogen blanket. The steam stripped functionalized polymer was finally dried using heated roll mill to obtain 4200 grams of functionalized EXXPRO. A functionalized iso-butylene based polymer was produced of the following structure:

Dried polymer was characterized using proton NMR spectroscopy and FTIR. $^1$H NMR spectroscopy showed complete disappearance of methylene proton (~$CH_2Br$), with new resonance appearing at 4.5 ppm for ~$CH_2O$ and olefinic signal at 5.1 ppm suggesting complete conversion at the end of 24 hours as shown in FIG. 3.

EXAMPLE 4

Williamson Etherification of EXXPRO™ 3745 with Farnesol

Figure 4:
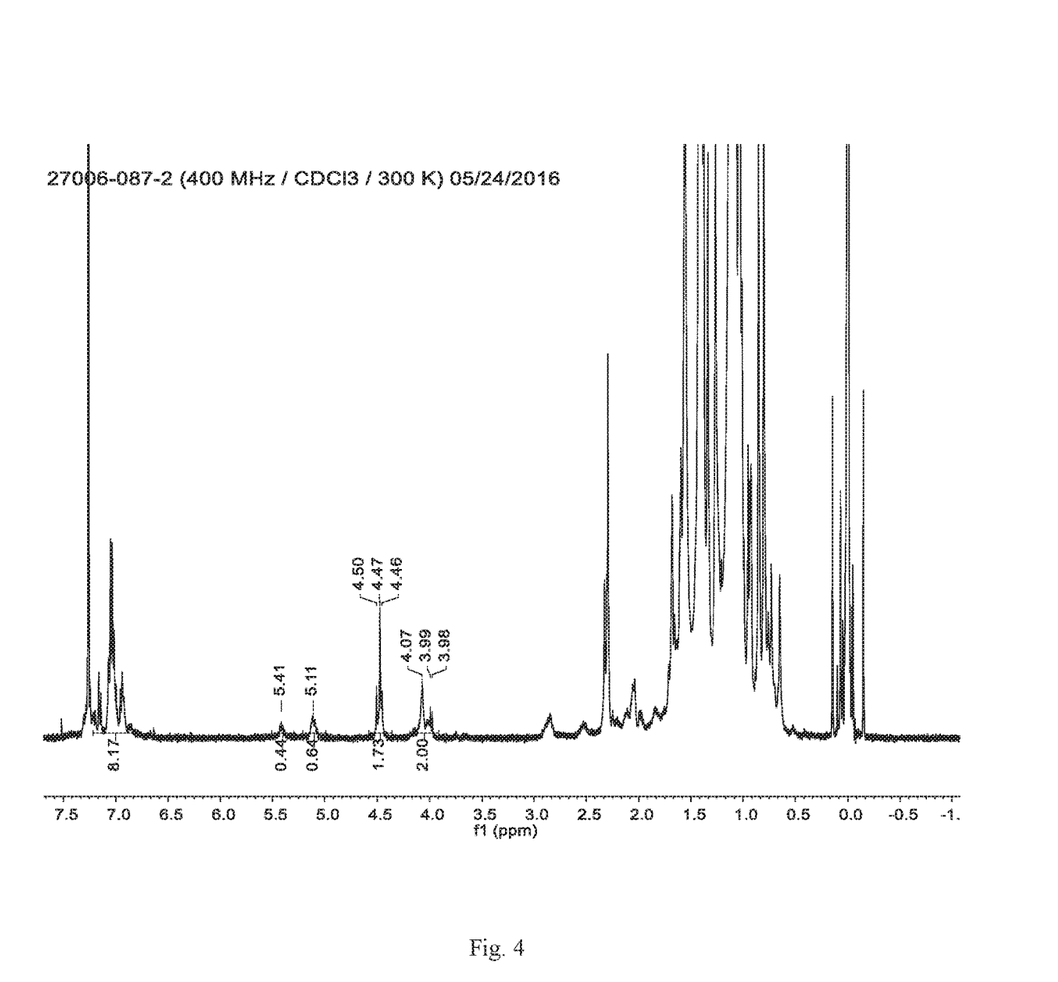
FIG. 4 is the characterization of the dried polymer using proton NMR spectroscopy, showing ~50% conversion of the benzyl bromide of EXXPRO™ 3745 to the benzyl ether of the product.
Figure 5:
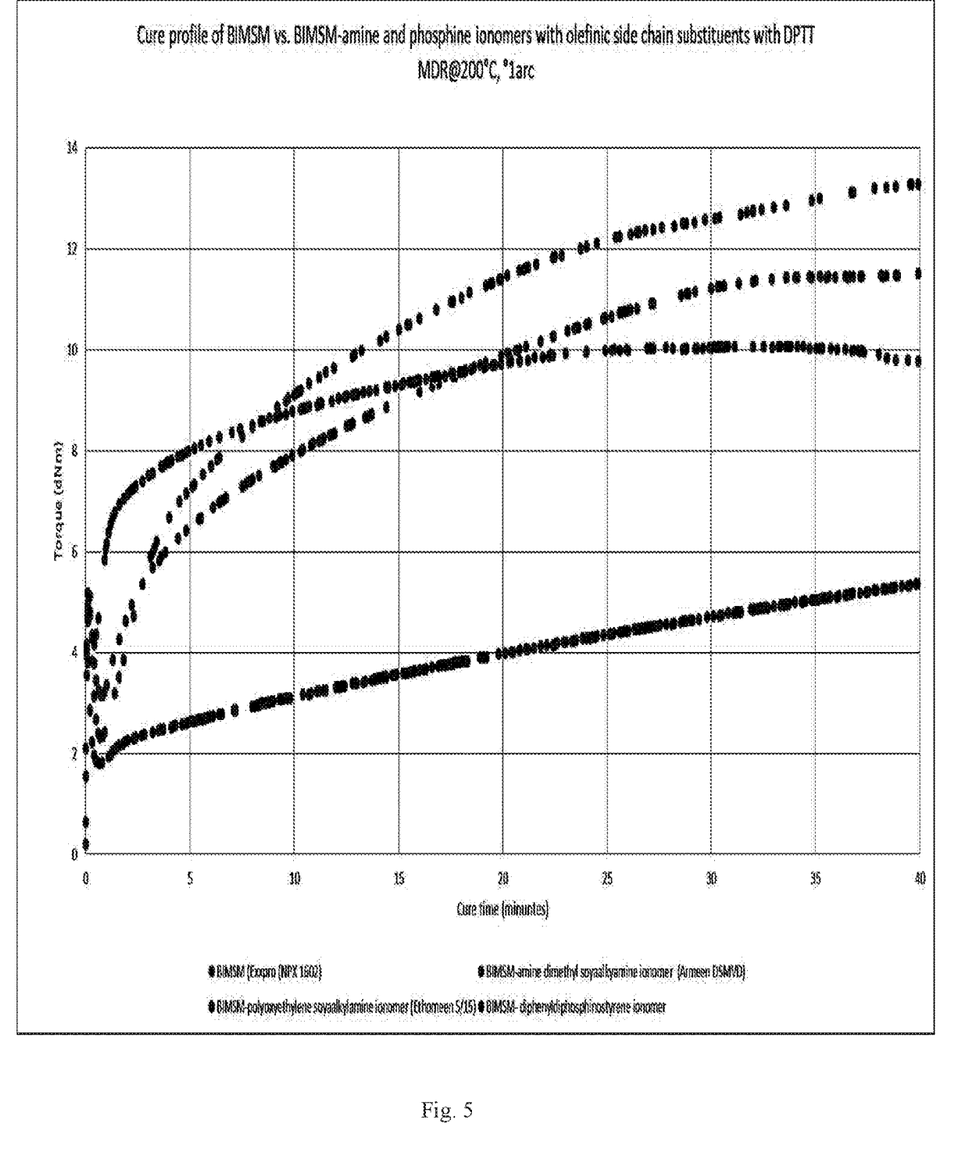
FIG. 5 shows the MDR cure profile of modified BIMSM-ionomers versus. BIMSM with DPTT curative.
Figure 6:
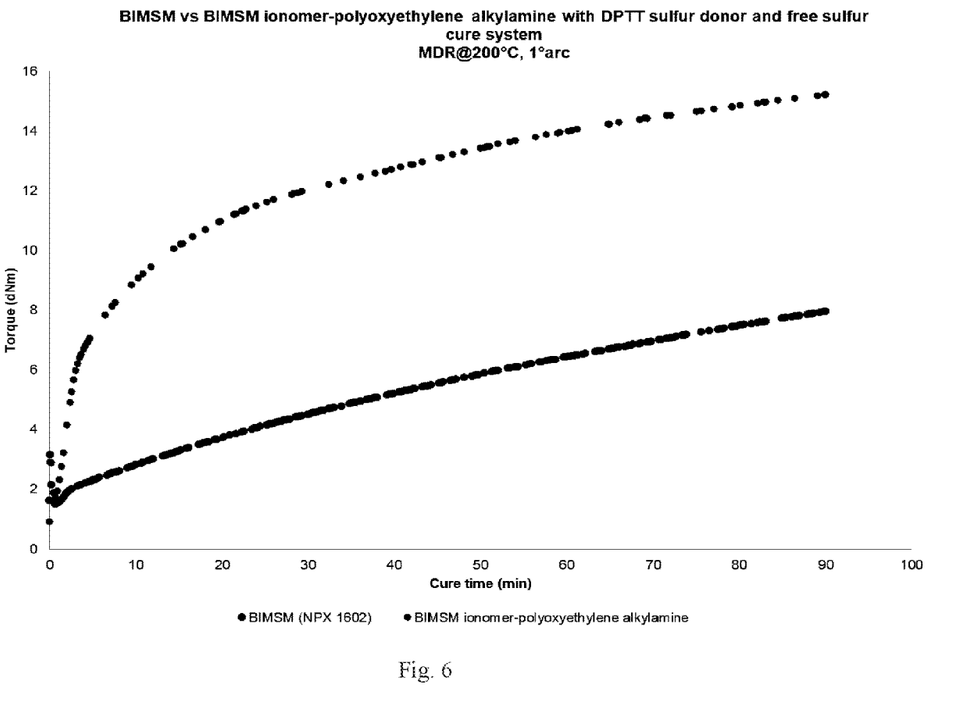
FIG. 6 shows the MDR cure profile modified BIMSM-ionomer (polyethylene alkylamine) versus BIMSM with DPTT and sulfur cure system.
Figure 7:
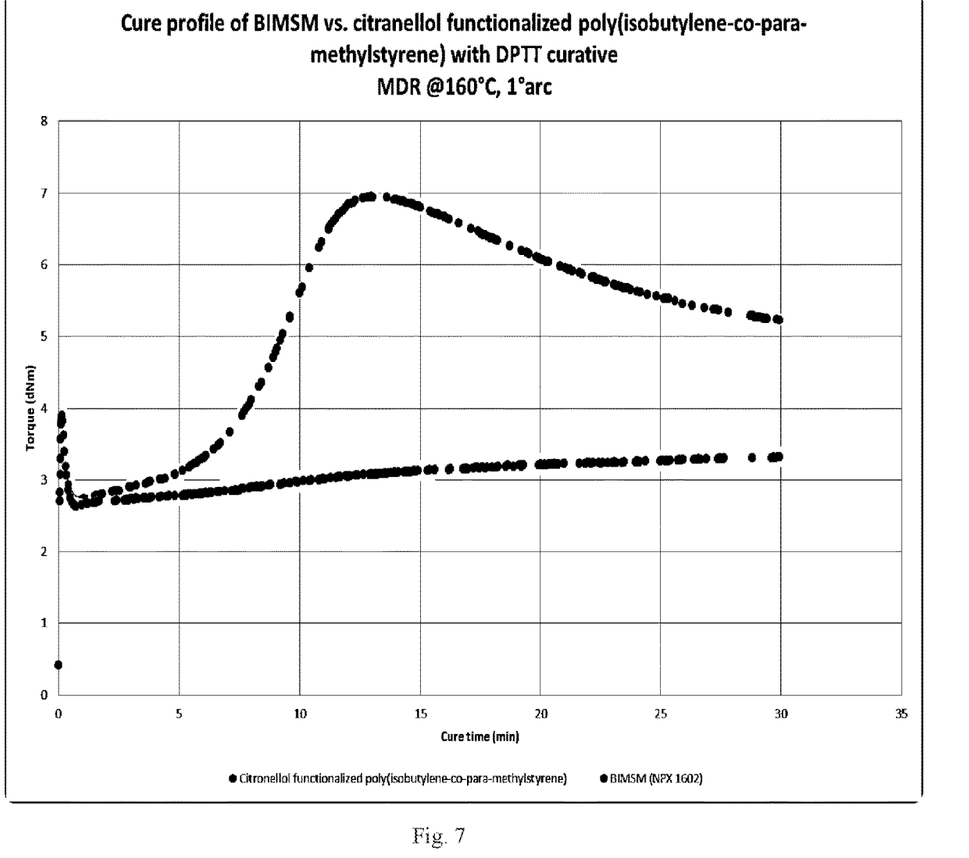
FIG. 7 shows the MDR cure profile of citronellol functionalized poly(isobutylene-co-para-methylstyrene) versus BIMSM with DPTT curative.
Figure 8:
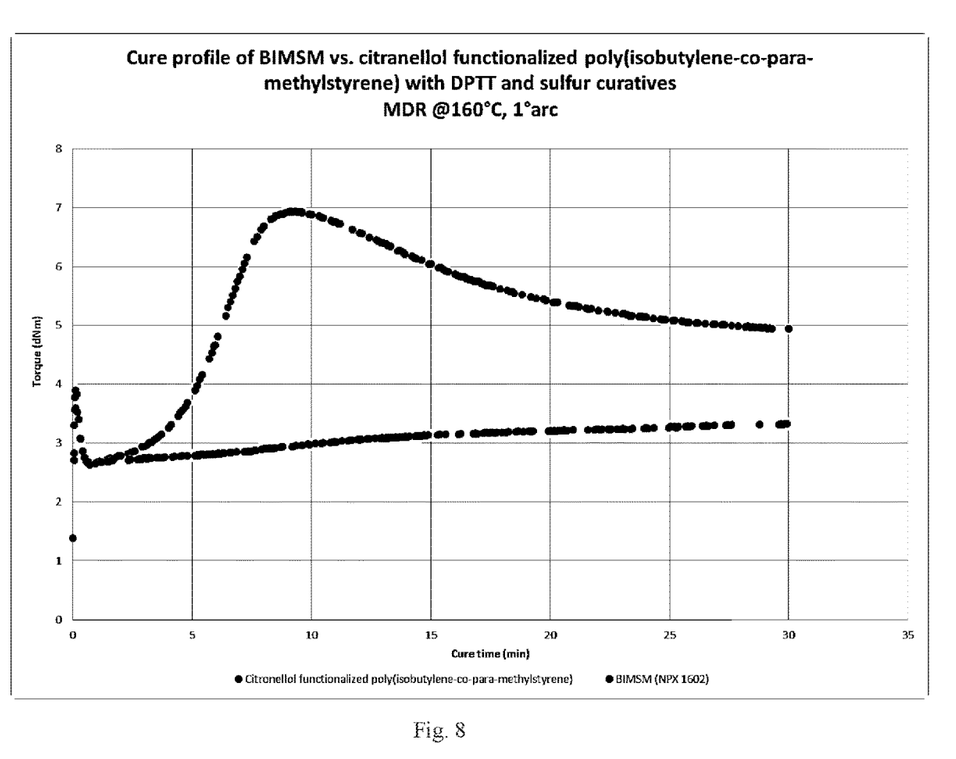
FIG. 8 shows the MDR cure profile of citronellol functionalized poly(isobutylene-co-para-methylstyrene) versus BIMSM with DPTT and sulfur cure system.

All manipulations performed in a glove box under inert atmosphere. A two-liter round bottom flask with a magnetic stir bar was charged with 100 grams of EXXPRO™ 3745, followed by one liter of anhydrous THF. The mixture was stirred at room temperature until a homogenous solution was formed. At this point, nine (9) grams of Farnesol was added to the solution with stirring, followed by 0.6 gram of sodium hydride (60% dispersion in mineral oil). The mixture was allowed to stir at room temperature for 16 hours, at which time the mixture was precipitated into two liters of acetone, washed with three 500 milli-liter portions of acetone, and dried under nitrogen flow at room temperature, yielding 100 grams of a white elastomeric material. The dried polymer was characterized using proton NMR spectroscopy. $^1$H NMR spectroscopy showed ~50% conversion of the benzyl bromide of EXXPRO™ 3745 to the benzyl ether of the product as shown in FIG. 4.

EXAMPLE 5

Rubber Compounding of BIMSM, BIMSM-amine and BIMSM-phosphine Ionomers and Citronellol Functionalized poly(isobutylene-co-para-methylstyrene)

Rubber compositions were prepared by one-step mixing in a laboratory Brabender mixer equipped with a cam type-mixing head. All compound ingredients, including rubber and curatives, were added into the preheated mixing chamber and mixed for 6 minutes at 35 rpm and a starting temperature of 75° C. All components are listed in phr, or part per hundred, of polymer unit. The formulation and relevant compound properties are summarized in Tables 1A & 1B and Table 2 immediately below. The cure behavior of each of the samples was studied using Moving Die Rheometer (MDR) at either 200° C. or 160° C. and 1° arc for 30, 40 or 90 minutes. The MDR cure profiles are shown in FIGS. 5 to 8.

Stress/Strain Measurements

Five test specimens were dies out with ASTM D4482 die and conditioned in the lab for 16 hours before testing.

Specimens were tested on an Instron 5565 with a long travel mechanical extensometer.

The load cell and extensometer are calibrated before each day of testing. Extensometer is calibrated @ 20 mm as gauge length.

Sample information, operator name, date, lab temperature, and humidity are all recorded.

Specimen thickness was measured at three places in the test area. The average value was entered when prompted. The lab temperature and humidity are measured Specimen was carefully loaded in the grips to ensure grips clamp on the specimen symmetrically. The extensometer grips was then attached to the sample in the test area.

The test was prompted to start. A pre-load of 0.1N was applied. Testing began with the crosshead moving at 20 inches/minute until a break is detected.

Five specimens from each sample were tested and the median values were used for reporting.

TABLE 1A

MDR Data and Tensile Data for BIMSM vs BIMSM-Amine and Phosphine Ionomers with Olefinic Side Chains

| Formulation (phr) | Example 5A | Example 5B | Example 5C |
|---|---|---|---|
| BIMSM (Exxpro NPX 1602) | 100 | | |
| Modified BIMSM-dimethyl soyalkylamine ionomer (Armeen DSMVD) | | 100 | |
| Modified BIMSM-polyoxythylene soyaalkylamine ionomer (Ethomeen S/15) | | | 100 |
| Modified BIMSM-phosphine (DPPS) ionomer | | | |
| Carbon black (N330) | 20 | 20 | 20 |
| DPTT (Dipentamethylenethiuram tetrasulfide) | 2 | 2 | 2 |
| Sulfur | | | |
| Total phr | 122 | 122 | 122 |
| MDR @200° C., 1° arc for 40 min | | | |
| ML (dN · m) | 1.81 | 3.99 | 3.9 |
| MH (dN · m) | 5.37 | 11.5 | 13.28 |
| MH − ML (dN · m) | 3.56 | 7.51 | 9.38 |
| ts2 (min) | 17.92 | 3.81 | 3.11 |
| t90 (min) | 34.43 | 25.78 | 26.46 |
| Tensile | | | |
| Modulus @ 100% [Mpa] | 4.55 | 4.61 | 4.91 |
| Modulus @ 200% [Mpa] | 4.88 | 5.80 | 6.20 |
| Modulus @ 300% [Mpa] | 5.18 | 7.08 | 7.87 |
| Ultimate tensile (Mpa) | 3.74 | 8.17 | 9.72 |
| Elongation at break (%) | 1702 | 459 | 416 |

TABLE 1B

MDR Data and Tensile Data for BIMSM vs BIMSM-Amine and Phosphine Ionomers with Olefinic Side Chains

| Formulation (phr) | Example 5D | Example 5E | Example 5F |
|---|---|---|---|
| BIMSM (Exxpro NPX 1602) | | 100 | |
| Modified BIMSM-dimethyl soyalkylamine ionomer (Armeen DSMVD) | | | |
| Modified BIMSM-polyoxythylene soyaalkylamine ionomer (Ethomeen S/15) | | | 100 |
| Modified BIMSM-phosphine (DPPS) ionomer | 100 | | |
| Carbon black (N330) | 20 | 20 | 20 |
| DPTT (Dipentamethylenethiuram tetrasulfide) | 2 | 2 | 2 |
| Sulfur | | 1 | 1 |
| Total phr | 122 | 123 | 123 |
| MDR @200° C., 1° arc for 40 min | | | |
| ML (dN · m) | 4.04 | 1.54 | 1.67 |
| MH (dN · m) | 10.07 | 5.33 | 12.91 |
| MH – ML (dN · m) | 6.03 | 3.79 | 11.24 |
| ts2 (min) | 0.97 | 16.84 | 1.85 |
| t90 (min) | 16.84 | 34.53 | 26.94 |
| Tensile | | | |
| Modulus @ 100% [Mpa] | 1.45 | 0.66 | 0.88 |
| Modulus @ 200% [Mpa] | 2.86 | 0.76 | 1.36 |
| Modulus @ 300% [Mpa] | 4.31 | 0.78 | 1.94 |
| Ultimate tensile (Mpa) | 6.00 | 0.22 | 5.03 |
| Elongation at break (%) | 429 | 2167 | 858 |

TABLE 2

MDR Data and Tensile Data for BIMSM vs Citronellol Functionalized Poly(isobutylene-co-para-methylstyrene)

| Formulation (phr) | Example 5G | Example 5H | Example 5I | Example 5J |
|---|---|---|---|---|
| BIMSM (Exxpro NPX 1602) | 100 | | 100 | |
| Citronellol functionalized poly(isobutylene-co-para-methylstyrene) | | 100 | | 100 |
| Carbon black (N330) | 20 | 20 | 20 | 20 |
| DPTT (Dipentamethylenethiuram tetrasulfide) | 2 | 2 | 2 | 2 |
| Sulfur | | | 1 | 1 |
| Total phr | 122 | 122 | 123 | 123 |
| MDR @160° C., 1° arc for 40 min | | | | |
| ML (dN · m) | 2.79 | 2.71 | 2.71 | 2.67 |
| MH (dN · m) | 3.83 | 6.96 | 3.9 | 6.94 |
| MH – ML (dN · m) | 1.04 | 4.25 | 1.19 | 4.27 |
| ts2 (min) | N/A | 8.91 | N/A | 3.55 |
| t90 (min) | 0.1 | 11.24 | 0.07 | 6.07 |
| Tensile | | | | |
| Modulus @ 100% [Mpa] | 0.56 | 0.55 | 0.62 | 0.63 |
| Modulus @ 200% [Mpa] | 0.59 | 0.77 | 0.69 | 0.92 |
| Modulus @ 300% [Mpa] | 0.56 | 1.09 | 0.69 | 1.33 |
| Ultimate tensile (Mpa) | 0.12 | 6.41 | 0.12 | 8.81 |
| Elongation at break (%) | >1974 | 1281 | >2750 | 1114 |

The present isobutylene-based polymers having an olefinic side chain substituents are useful in pharmaceutical applications, and tire applications as rubber compositions with the use of EV or semi-EV vulcanizations systems. The subject rubber compositions comprise thioalkylated functionalized iso-butylene based polymer and a sulfur donor and/or accelerator cure system as described above. These zinc-free rubber compositions further comprise one or more hydrocarbon resins and a filler as described above.

As used herein, hydrocarbon resins include aliphatic hydrocarbon resins, cyclic aliphatic hydrocarbon resins, modified aliphatic hydrocarbon resins, aromatic hydrocarbon resins, modified aromatic hydrocarbon resins, cyclopentadiene-based resins (including but not limited to polycyclopentadiene resins, hydrogenated polycyclopentadiene resins, etc.), gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes, modified terpenes, hydrogenated rosin acids, hydrogenated rosin acids, hydrogenated rosin esters, derivatives thereof and/or combinations thereof. Such resins and methods for making them have been described in, for example, U.S. Pat. Nos. 4,629,766; 5,874,512; 6,232,418; 6,455,652; and 6,992,131.

The hydrocarbon resin can be a modified hydrocarbon resin and can have softening points of greater than 80° C., greater than 85° C., greater than 90° C., greater than 92° C., greater than 95° C., greater than 100° C., greater than 110° C., greater than 120° C., greater than 135° C., greater than 140° C., greater than 145° C., greater than 150° C., or greater than 160° C., as measured by ASTM D 6090-97. Alternatively stated, the hydrocarbon resin and modified hydrocarbon resin may have softening points of from 80° C. to 160° C., 82° C. to 140° C., 85° C. to 130° C., 90° C. to 125° C., 95° C. to 120° C., or 95° C. to 140° C., as measured by ASTM D 6090-97.

The hydrocarbon resin and modified hydrocarbon resin can also have an aromaticity (% aromatic protons) of 15% or less, 12% or less, 8% or less, 6% or less, 4% or less, or 2% or less. Alternatively stated, the hydrocarbon resin and modified hydrocarbon resin may have an aromaticity (% aromatic protons) of from 1 to 15%, 1 to 12%, 1 to 10%, 1 to 8%, 2 to 6%, or 2 to 4%.

Suitable hydrocarbon resins in the subject zinc-free rubber compositions include, but are not limited to, available ESCROEZ™ resins, for example, ESCOREZ™ resins 1000, 2000, and 5000 series, from ExxonMobil Chemical Company, Houston, Tex. By way of example, ESCOREZ™ 1102 refers to an aliphatic hydrocarbon resin having a softening point of 212 F., a melt viscosity of 1650 cP, a molecular weight-number average (Mn) of 1300 g/mol and a molecular weight—weight average (Mw) of 2900 g/mol useful to increase tack and adhesive properties and modify mechanical and optical properties of polymer blends and thermally polymerized.

ESCOREZ™ 2520 refers to a petroleum hydrocarbon tackifier resin having C5-C6 olefins and diolefins as major components and thermally polymerized.

ESCOREZ™ E5000 refers to a petroleum hydrocarbon tackifier resin having polycyclodienes (C10-C12 cyclodiene dimers plus dicyclopentadiene with or without C8-C10 vinyl aromatics) as a major component which is thermally polymerized.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While this teaching has been described with respect to a number of aspects and examples, those skilled in the art, having benefit of this disclosure, will appreciate that other aspects can be devised which do not depart from the scope and spirit of the inventions disclosed herein.

The invention claimed is:

1. An isobutylene-based polymer composition comprising:
    (a) an isobutylene-based functionalized polymer; and
    (b) one of or a combination of any of the following:
        (i) a sulfur donor;
        (ii) a blend of sulfur and a sulfur donor; and
        (iii) an accelerator cure system;
    wherein the isobutylene-based polymer composition has less than 0.01 wt % zinc based on a total weight of the isobutylene-based polymer composition.

2. The isobutylene-based polymer composition of claim 1, wherein the isobutylene-based functionalized polymer is a modified poly(isobutylene-co-para-methylstyrene) amine-ionomer, wherein the poly(isobutylene-co-para-methylstyrene) amine-ionomer is selected from the group consisting of 1°, 2°, and 3° amine nucleophiles with one or more pendant vinyl groups.

3. The isobutylene-based polymer composition of claim 2, wherein an amount of the poly(isobutylene-co-para-methylstyrene) amine-ionomer present in the isobutylene-based functionalized polymer is about 0.5 wt % to about 50 wt % based on the total weight of the isobutylene-based functionalized polymer.

4. The isobutylene-based polymer composition of claim 1, wherein the isobutylene-based functionalized polymer is a modified poly(isobutylene-co-para-methylstyrene)-phosphine ionomer, wherein the modified poly(isobutylene-co-para-methylstyrene)-phosphine ionomer is selected from diphenylphosphinostyrene, allyldiphenylphosphine, diallylphenylphosphine, diphenylvinylphosphine, triallylphosphine, and combinations thereof.

5. The isobutylene-based polymer composition of claim 4, wherein an amount of the phosphine ionomer present in the isobutylene-based functionalized polymer is about 0.5 wt % to about 50 wt % based on the total weight of the isobutylene-based functionalized polymer.

6. The isobutylene-based polymer composition of claim 1, further comprising at least one filler.

7. The isobutylene-based polymer composition of claim 1, wherein the sulfur donor is selected from the group consisting of tetramethyl thiuram disulfide ("TMTD"), 4,4'-dithiodimorpholine, dipentamethylene thiuram tetrasulfide ("DPTT"), and thiocarbamyl sulfonamide.

8. The isobutylene-based polymer composition of claim 1, wherein the accelerator cure system comprises one or more of thiazoles, amines, guanidines, sulfenamides, thiurams, dithiocarbamates, and/or zanthates.

9. The isobutylene-based polymer composition of claim 8, wherein the accelerator cure system is N-cyclohexyl-2-benzothiazole sulfenamide ("CBS") or diphenylguanidine ("DPG").

10. The isobutylene-based polymer composition of claim 6, wherein the filler is selected from a group of carbon black, white filler, and combinations thereof.

11. The isobutylene-based polymer composition of claim 1, wherein the composition is useful as a thermoset in pharmaceutical and tire applications.

12. A thermoset composition comprising:
    (a) an isobutylene-based functionalized polymer; and
    (b) one of or a combination of any of the following:
        (i) a sulfur donor;
        (ii) a blend of sulfur and a sulfur donor; and
        (iii) an accelerator cure system;
    wherein the thermoset composition has less than 0.01 wt % zinc based on the total weight of the thermoset composition.

13. The thermoset composition of claim 12, wherein the isobutylene-based functionalized polymer is a modified poly(isobutylene-co-para-methylstyrene) amine-ionomer, wherein the poly(isobutylene-co-para-methylstyrene) amine-ionomer is selected from the group consisting of 1°, 2°, and 3° amine nucleophiles with one or more pendant vinyl groups.

14. The thermoset composition of claim 13, wherein an amount of the poly(isobutylene-co-para-methylstyrene) amine-ionomer present in the isobutylene-based functionalized polymer is about 0.5 wt % to about 50 wt % based on the total weight of the isobutylene-based functionalized polymer.

15. The thermoset composition of claim 12, wherein the isobutylene-based functionalized polymer is a modified poly(isobutylene-co-para-methylstyrene)-phosphine ionomer, wherein the phosphine ionomer is selected from diphenylphosphinostyrene, allyldiphenylphosphine, diallylphenylphosphine, diphenylvinylphosphine, triallylphosphine, and combinations thereof.

16. The thermoset composition of claim 15, wherein an amount of the phosphine ionomer present in the isobutylene-based functionalized polymer is about 0.5 wt % to about 50 wt % based on the total weight of the isobutylene-based functionalized polymer.

17. The thermoset composition of claim 12, further comprising at least one filler.

18. The thermoset composition of claim 12, wherein the sulfur donor is selected from the group consisting of tetramethyl thiuram disulfide ("TMTD"), 4,4'-dithiodimorpholine, dipentamethylene thiuram tetrasulfide ("DPTT"), and thiocarbamyl sulfonamide.

19. The thermoset composition of claim 12, wherein the accelerator cure system comprises one or more of thiazoles, amines, guanidines, sulfenamides, thiurams, dithiocarbamates, and/or zanthates.

20. The thermoset composition of claim 19, wherein the accelerator cure system is N-cyclohexyl-2-benzothiazole sulfenamide ("CBS") or diphenylguanidine ("DPG").

21. The thermoset composition of claim 17, wherein the filler is selected from a group of carbon black, white filler, and combinations thereof.

22. A rubber composition comprising the thermoset composition of claim 12.

23. The rubber composition of claim 22 further comprising a hydrocarbon resin.

24. An article comprising the rubber composition of claim 22.

\* \* \* \* \*